US006483027B1

(12) United States Patent
Howard et al.

(10) Patent No.: US 6,483,027 B1
(45) Date of Patent: Nov. 19, 2002

(54) SELF-ADJUSTABLE END CAP ASSEMBLY

(75) Inventors: Carol A. Howard, Oxford, CT (US);
David L. Lutz, Woodbridge, CT (US);
Lawrence Turner, Seymour, CT (US)

(73) Assignee: Hubbell Incorporated, Orange, CT (US)

( * ) Notice: Subject to any disclaimer, the term of this patent is extended or adjusted under 35 U.S.C. 154(b) by 27 days.

(21) Appl. No.: 09/655,936

(22) Filed: Sep. 6, 2000

(51) Int. Cl.[7] .................................................. H02G 3/14
(52) U.S. Cl. .............................. 174/48; 174/50; 174/54; 16/2.1; 439/519
(58) Field of Search ............................ 174/48, 49, 60, 174/65 G, 51, 152 G, 152 R, 153 G, 54, 61; 248/56; 16/2.1, 2.2; 220/3.7; 439/519, 892, 410, 154, 521, 934, 137–140, 145, 93, 113

(56) References Cited

U.S. PATENT DOCUMENTS

| 3,619,477 A | * 11/1971 | Rasmussen .................... 174/66 |
| 3,627,220 A | * 12/1971 | Vogel ........................... 242/609 |
| 4,059,321 A | * 11/1977 | Rasmussen et al. ........... 174/48 |
| 4,837,406 A | * 6/1989 | Emmons ........................ 220/3.7 |
| 4,918,886 A | 4/1990 | Benoit et al. |
| 4,969,231 A | * 11/1990 | Mader et al. .................. 16/421 |
| 4,998,897 A | 3/1991 | Rose |
| 5,167,047 A | * 12/1992 | Plumley ................... 174/153 G |
| 5,664,957 A | 9/1997 | Starr |
| 6,036,535 A | 3/2000 | Whiteman, Jr. et al. |
| 6,037,538 A | 3/2000 | Brooks |
| D440,448 S | * 4/2001 | Horsten ....................... D6/580 |

* cited by examiner

Primary Examiner—Dean A. Reichard
Assistant Examiner—Angel R. Estrada
(74) Attorney, Agent, or Firm—Marcus R. Mickney; Alfred N. Goodman

(57) ABSTRACT

A self-adjusting end cap for capping an object having an opening. The end cap includes a base that has an inner and an outer surface, at least one post connected to the base inner surface, and at least one rib extending outwardly from the post. The rib is adapted to fit in a channel in an opening of an object to be capped. When the end cap and object are aligned for connection, the rib extends beyond an inner wall of the channel. A portion of the rib is sheared off by the inner wall of the channel upon insertion of the post and rib in the channel, thereby positioning the end cap within the object. The posts in combination with the ribs create a precise and tight friction fit between the end cap and the object. Preferably, the end cap has two posts, each with a rib extending outwardly therefrom, and the object has two channels, each having an inner wall. The outer edges of the ribs are separated by a first distance, and the channels are separated by a second distance. The first distance is preferably greater than the second distance. Then, upon insertion of the end cap into the object, the extra width on the ribs is sheared off by the inner walls of the channels, thereby positioning the end cap within the object.

44 Claims, 3 Drawing Sheets

SELF-ADJUSTABLE END CAP ASSEMBLY

FIELD OF THE INVENTION

The invention relates to a self-adjustable end cap for capping an open end of an object. More particularly, the invention relates to a self-adjustable end cap assembly for capping an open end of a raceway or a relocatable power tap. Still more particularly, the invention relates to a self-adjustable end cap assembly for capping an open end of an object having at least one post and at least one shearable rib for creating a self-adjusting friction fit between the end cap and the object.

BACKGROUND OF THE INVENTION

End caps are widely used to cap open ends of objects, such as pipes, tubes, raceways and relocatable power taps. A properly fitted end cap is particularly vital for preventing a person from gaining access to electrical components housed in such an object, thereby avoiding personal injury caused by coming into contact with a live electrical component. An end cap positioned at a termination point of such an object also prevents moisture, dust or other foreign materials from entering the object. A properly fitted end cap is necessary for raceways and power taps since they house various power and signal conductors that need to be kept free from the influence of potentially damaging foreign materials.

Many existing end cap assemblies are secured to an end of an object to be capped by fasteners. When installing such an end cap, one must be careful that the end cap is properly aligned with the object being capped so that there are no gaps permitting foreign bodies to enter the object. The end cap must also be securely fastened to the object to further prevent any gaps between the end cap and object due to a loosely fastened end cap. Additionally, care must be used to ensure proper alignment of the end cap with the object to provide an aesthetically pleasing appearance.

Many existing end caps assemblies also include several parts, thereby requiring a time consuming and inefficient installation process. Additionally, alignment becomes more difficult as the number of parts increases.

Examples of existing end cap assemblies are disclosed in the following U.S. Pat. No. : 6,037,538 to Brooks; U.S. Pat. No. 6,036,535 to Whiteman, Jr. et al.; U.S. Pat. No. 5,664,957 to Starr; U.S. Pat. No. 4,998,897 to Rose; and U.S. Pat. No. 4,918,886 to Benoit et al.

Thus, there is a continuing need to provide improved end cap assemblies.

SUMMARY OF THE INVENTION

Accordingly, it is a primary objective of the invention to provide an end cap assembly that is self-adjusting, thereby eliminating alignment problems between the end cap and the object to be capped.

Another object of the invention is to provide an end cap assembly that is quickly and easily installed, thereby providing an efficient installation procedure.

Another object of the invention is to provide an end cap assembly that is easy to manufacture, thereby reducing manufacturing costs.

The foregoing objects are basically attained by providing a self-adjusting end cap including a base having an inner and an outer surface; at least one post connected to the base inner surface; and at least one rib extending outwardly from the at least one post, the at least one post and the at least one rib adapted to fit into a channel in an opening of an object to be capped; and wherein the at least one rib extends beyond an inner wall of the channel, such that the at least one rib is sheared by the inner wall of the channel upon insertion of a portion of said at least one post and said at least one rib into the channel for positioning the end cap within the object.

The foregoing objects are also attained by providing a self-adjusting end cap assembly including a base having an inner and an outer surface; two posts connected to the base inner surface; a rib extending outwardly from each of the posts, the ribs having distal edges separated by a first distance; an object to be capped, the object having an opening; and two channels connected to the opening adapted to receive a portion of the posts and the ribs, each of the channels having an inner wall separated by a second distance; and wherein the first distance is greater than the second distance, such that the ribs are sheared by the inner walls of the channels upon inserting the posts and the ribs into the channels for positioning the base within the object.

Other objects, advantages and salient features of the invention will become apparent from the following detailed description, which, taken in conjunction with the annexed drawings, discloses preferred embodiments on the invention.

DRAWINGS

Referring now to the drawings that form a part of this original disclosure:

DETAILED DESCRIPTION OF THE INVENTION

Figure 1:
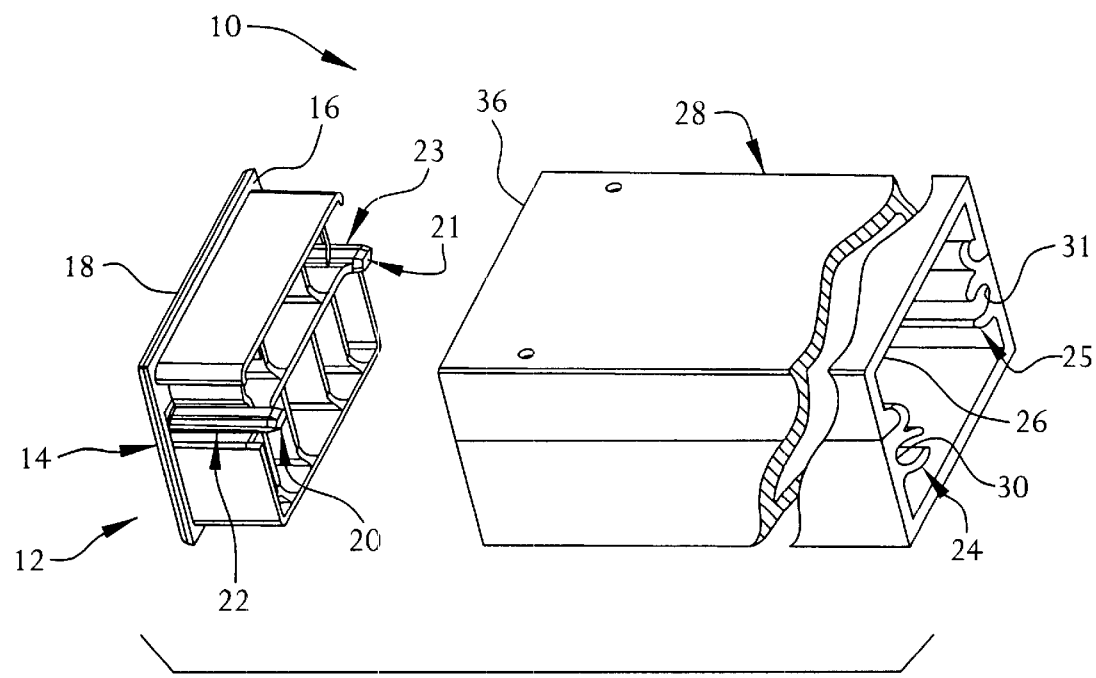
FIG. 1 is an exploded, perspective view of the self-adjustable end cap assembly, including an end cap and a relocatable power tap housing.
Figure 2:
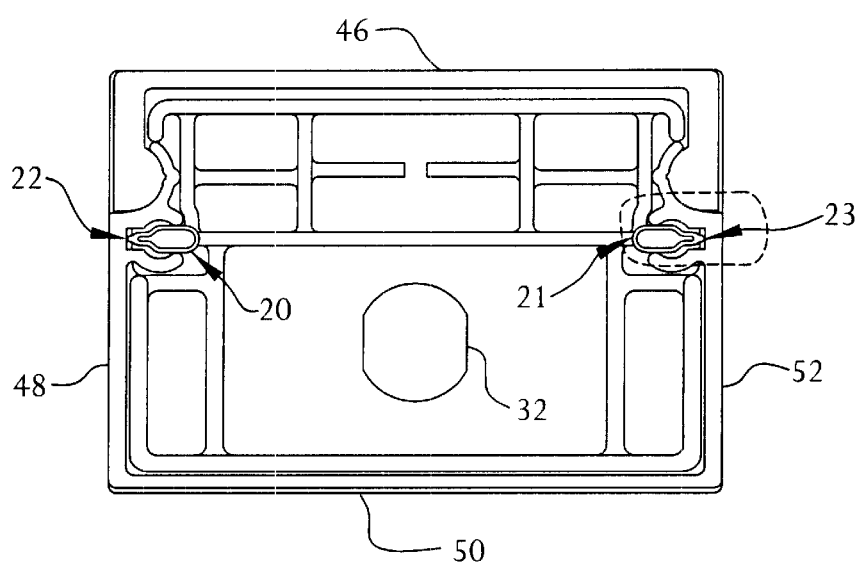
FIG. 2 is a front elevational view of the self-adjustable end cap assembly secured to the power tap housing, as seen looking through an uncapped end of the housing.
Figure 3:
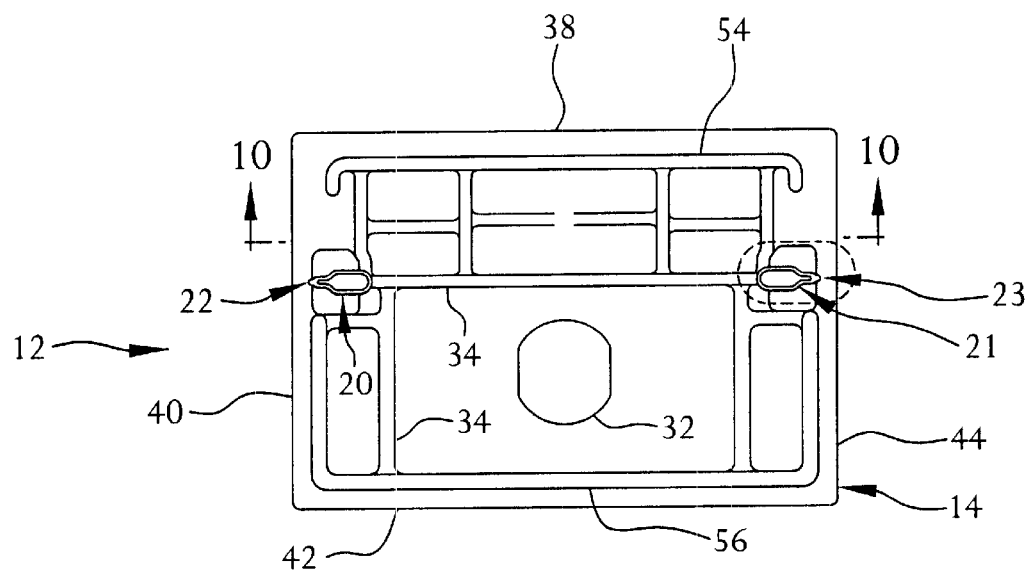
FIG. 3 is a front elevational view of a self-adjustable end cap.

FIGS. 1 and 2 show an end cap assembly 10 of the present invention. The end cap assembly includes a self-adjustable end cap 12 and an object 28 to be capped. As seen in FIGS. 1 and 2, a self-adjusting end cap 12 in accordance with the invention comprises a base 14 having an inner surface 16 and an outer surface 18, two posts 20 and 21 connected to the base inner surface, and ribs 22 and 23 extending outwardly respectively from the posts. The posts 20 and 21 and the ribs 22 and 23 are adapted to fit into channels 24 and 25 in an opening 26 of an object 28 to be capped. The ribs 22 and 23 extend beyond the inner walls 30 and 31 of the channels 24 and 25, such that the ribs are sheared by the inner walls of the channels upon insertion of the posts and the ribs into the channels. A precise friction fit is created between the end cap 12 and the object 28 by the insertion of the posts 20 and 21 and the ribs 22 and 23 into the channels. While two posts, ribs, channels and inner walls have been shown, only one post, rib, channel and inner wall may be used to meet the objectives of the invention.

A base 14 for a self-adjusting end cap 12 is shown in FIGS. 1–3 and 8–10. The base 14 has an inner surface 16 and an outer surface 18. The inner surface 16 is adapted to be received by an object 28 to be capped. The outer surface 18 is exposed when the end cap 12 is inserted into an object to be capped. The base 14 may have a hole 32, as shown in FIG. 2, for allowing wiring to pass through the end cap 12 after it has been inserted into an object 28. Strengthening ribs 34 may be connected to the inner surface 16 of the base 14 to provide strength to the end cap 12, as shown in FIGS. 1–3 and 10. Walls 54 and 56 may be connected to the inner surface 16 of the base 14 to further secure the end cap 12 to the object 28. Preferably, the base 14 has a substantially rectangular shape.

A post 20 for the end cap 12 is shown in FIGS. 1–3, 5, and 7–10. The post 20 is connected to the inner surface 16 of the base 14. Preferably, the end cap 12 has two posts 20 and 21, as shown in FIGS. 1–3 and 9–10, which are adapted to fit into channels 24 and 25. Preferably, the post 20 is substantially perpendicular to the base 14. The post 20 may be any shape, but preferably it is rectangular or oblong having an upper surface 66 and a lower surface 68. The post may have rounded corners.

Figures 8, 9:
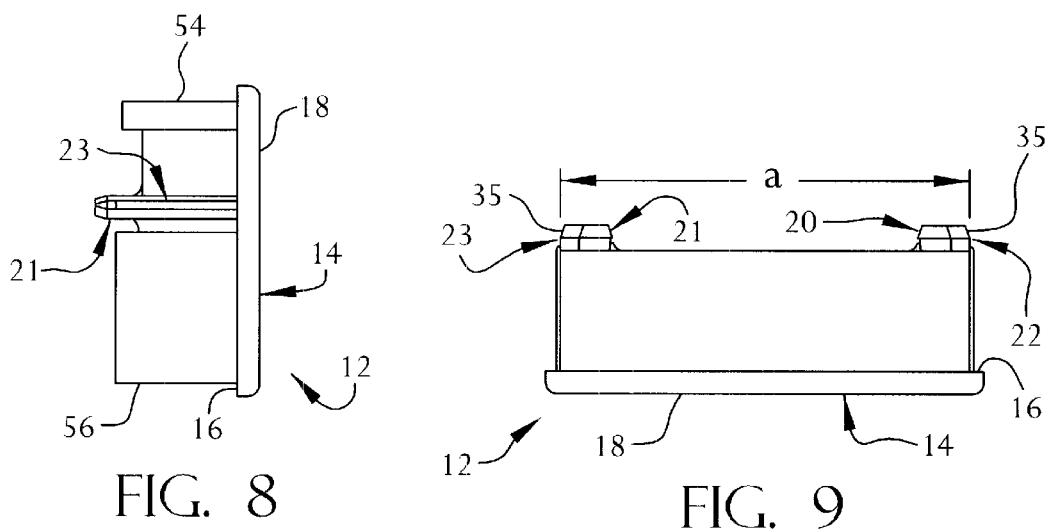
FIG. 8 is right side elevational view of the end cap.
FIG. 9 is a bottom plan view of the end cap.
Figure 10:
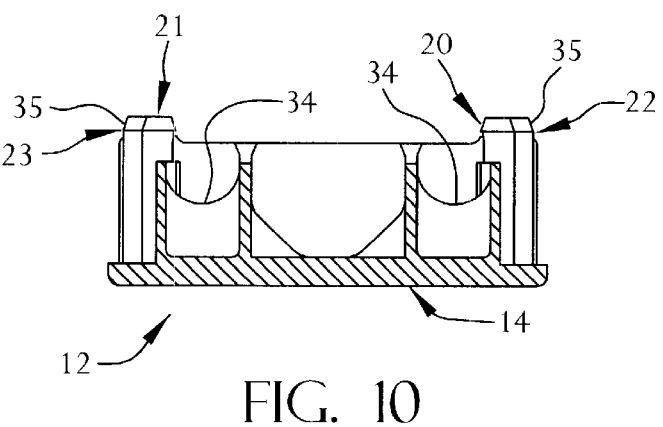
FIG. 10 is a bottom plan cross-sectional view, taken along line 10—10 of FIG. 3.

A shearable rib 22 for the end cap 12 is shown in FIGS. 1–3, 5, and 7–10. Preferably, the end cap 12 has two thin, shearable ribs 22 and 23, each rib extending outwardly respectively from the posts 20 and 21. A distal edge 35 of ribs 22 and 23 is tapered, as shown in FIGS. 8–10, for facilitating insertion of the ribs 22 and 23 in the channels 24 and 25 in the object 28 to be capped. The outer edges of the ribs 22 and 23 are separated by a first distance, distance "a" of FIG. 3. Preferably, the rib has a width of approximately 0.0282 inches, a depth of approximately 0.01 inches, and a length of approximately 0.72 inches.

The end cap 12, including the base 14, the posts 20 and 21, and the ribs 22 and 23, is preferably unitarily formed, thereby reducing the number of parts required to manufacture the end cap. This results in an efficient and inexpensive manufacturing process. The end cap is preferably made from a plastic, such as a thermoplastic.

Figure 4:
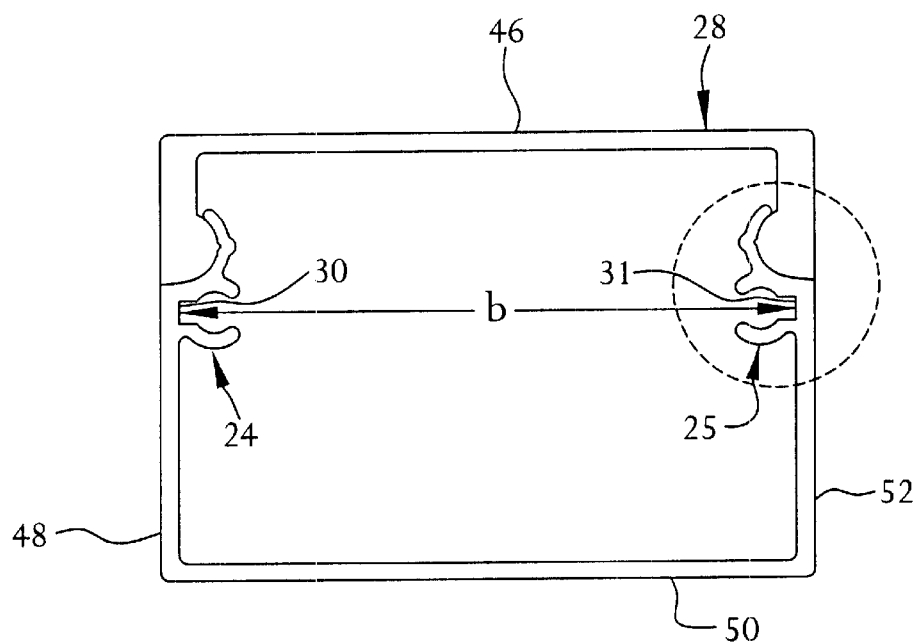
FIG. 4 is a front elevational view of a relocatable power tap housing.

The end cap assembly 10 also includes an object 28 to be capped, as shown in FIGS. 1 and 4. The object 28 to be capped includes, but is not limited to, a raceway and a relocatable power tap. The raceway 28 has an opening 26 for receiving an end cap 12.

Figures 5, 6, 7:
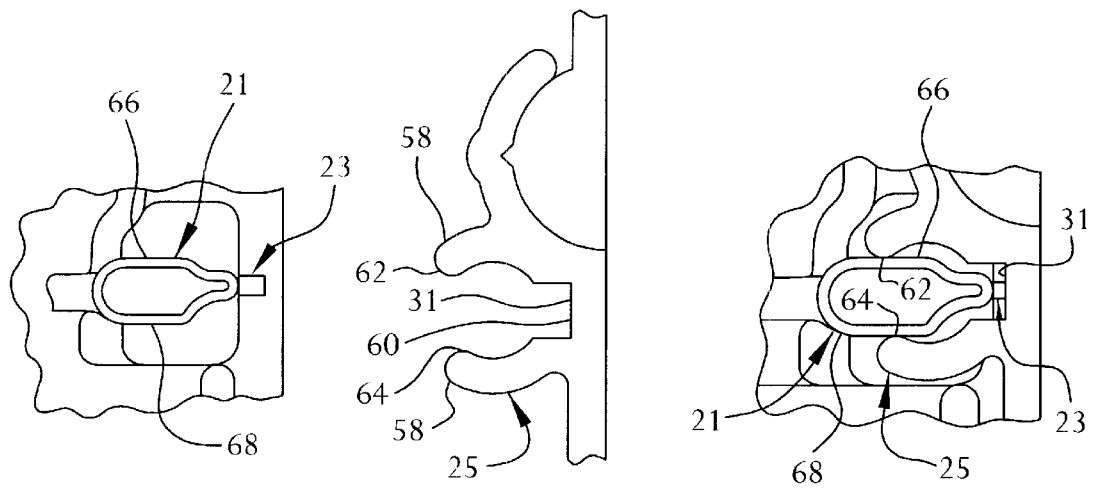
FIG. 5 is an detailed front elevational view of a post and a shearable rib from FIG. 3.
FIG. 6 is an detailed front elevational view of a channel in the power tap housing from FIG. 4.
FIG. 7 is a detailed front elevational view of a post and shearable rib received by the channel in the housing, showing a smaller rib due to shearing by an inner wall of the channel from FIG. 2.

A channel for the end cap assembly 10 is shown in FIGS. 4 and 6. Preferably, the object 28 has two channels 24 and 25. The channels 24 and 25 are adapted to receive a portion of the posts 20 and 21 and the ribs 22 and 23. Each of the channels 24 and 25 has an inner wall 30 and 31 that shears a portion of the shearable ribs 22 and 23 from the posts 20 and 21 when the ribs and posts are inserted in the channels, as shown in FIGS. 2 and 7. The outer portion 58 of the channels 24 and 25 is curvilinear, while the inner portion 60 of the channels is flat, as shown in FIG. 6. The channels have an upper receiving surface 62 and a lower receiving surface 64 for receiving the upper and lower post surfaces 66 and 68. Preferably, the outer portions 58 of the channel are separated by a distance of approximately 0.12 inches. The channels 24 and 25 are separated by a second distance, distance "b" of FIG. 4. Preferably, distance "a" is greater than distance "b."

The object 28 to be capped is preferably made of metal. Preferably, the object 28 and the channels 24 and 25 are unitarily formed.

ASSEMBLY AND DISASSEMBLY

As shown in FIG. 2, an object 28 has been capped with an end cap 12 of the present invention. The object 28 is capped by inserting the end cap 12 into the object 28 as shown in FIG. 1 to form an end cap assembly 10.

A central axis of the posts 20 and 21 is aligned with the central axis of the channels 24 and 25 prior to inserting the end cap 12 in the object 28 to be capped. Then the ribs 22 and 23 and a portion of the posts 20 and 21 (FIG. 5) are inserted in the channels 24 and 25 (FIG. 6). Since distance "a" between the ribs 22 and 23 is greater than distance "b" between the channels 24 and 25, the inner walls 30 and 31 shear off the extra width of the ribs, as shown in FIG. 7, for positioning the end cap within the object. The end cap 12 is inserted in the object 28 until the inner surface 16 of the base 14 mates with an end surface 36 of the object. At this point, the end cap 28 cannot be inserted any further into the object 28, and the edges 38, 40, 42 and 44 of the end cap are flush with edges 46, 48, 50 and 52, respectively, of the object 28.

A portion of the posts 20 and 21 is received by the channels in the object 28 to be capped. A portion of the upper surface 62 of the post 21 is received by the upper receiving surface 66 of the channel 25, as shown in FIG. 6. A portion of the lower surface 64 of the post 21 is received by the lower receiving surface 68 of the channel 25. A friction fit is created due to the distance between the upper and lower post surfaces 62 and 64 being greater than the distance between the upper and lower post receiving surfaces 66 and 68. The vertical direction is defined as the direction between surfaces 46 and 50 of the object. The horizontal distance is defined as the direction between surfaces 48 and 52 of the object. The friction fit created between the post 21 and the channel 25 prevents vertical motion by the end cap 12 within the object 28 to be capped, as well as preventing removal of the end cap from the object. The friction fit between the shearable rib 23 and the inner wall 31 of the channel 25 prevents horizontal motion by the end cap 12 within the object 28.

The end cap 12 may be removed from the object by inserting a thin, flat object, such as a screwdriver, between the inner surface 16 of the end cap and the end surface 36 of the object 28.

If upon insertion of the end cap 12 into the object 28, the first distance is greater than the second distance, any extra width on the ribs 20 and 21 is sheared off by the inner walls 30 and 31 of the channels 24 and 25 thereby positioning the end cap within the object. The shearable ribs are self-adjustable in that they allow for variances in the distance between the channels. Since the ribs are shearable, variations in the distance between the channels of the object do not prevent the end cap from capping that object and proper positioning of the end cap within that object is obtainable.

While advantageous embodiments have been chosen to illustrate the invention, it will be understood by those skilled in the art that various changes and modifications may be made therein without departing from the scope of the invention as defined in the appended claims.

What is claimed is:

1. A self-adjusting end cap, comprising:
   a base having an inner and an outer surface;
   at least one post connected to said base inner surface, said at least one post adapted to fit into a channel in an opening of an object to be capped; and
   at least one rib extending outwardly from said at least one post, a portion of said at least one rib adapted to fit into the channel in the opening of the object;
   wherein said at least one rib extends beyond an inner wall of the channel, such that said at least one rib is sheared by the inner wall of the channel upon insertion of said at least one post and at least one rib into the channel for positioning said end cap within the object.

2. The end cap of claim 1, wherein said base has a hole for allowing wiring to pass through said end cap.

3. The end cap of claim 1, wherein said base is substantially rectangular.

4. The end cap of claim 1, wherein said at least one post is substantially oblong.

5. The end cap of claim 1, wherein said at least one post is substantially rectangular.

6. The end cap of claim 1, wherein said at least one post has rounded corners.

7. The end cap of claim 1, wherein said at least one post is substantially perpendicular to said base.

8. The end cap of claim 1, wherein said at least one rib is made of plastic.

9. The end cap of claim 1, wherein said at least one rib is tapered at a distal edge for facilitating insertion of said at least one rib into the object to be capped.

10. The end cap of claim 1, wherein said base, said at least one post and said at least one rib are unitarily formed.

11. A self-adjusting end cap, comprising:
    a base having an inner and an outer surface;
    two posts connected to said base inner surface, each of said posts having a portion of said post adapted to fit in a channel in an opening of an object to be capped; and
    a rib extending outwardly from each of said posts, said ribs having distal edges separated by a first distance, and each of said ribs adapted to fit in the channel in the opening of the object, each channel having an inner wall, the inner walls of the channels separated by a second distance;
    wherein said first distance is greater than the second distance, such that said ribs are sheared by the inner walls of the channels upon inserting said posts and said ribs into the channels for positioning said end cap within the object.

12. The end cap of claim 11, wherein said base has a hole for allowing wiring to pass through said end cap.

13. The end cap of claim 11, wherein said base is substantially rectangular.

14. The end cap of claim 11, wherein said posts are substantially rectangular.

15. The end cap of claim 11, wherein said posts have corners that are rounded.

16. The end cap of claim 11, wherein said posts are substantially oblong.

17. The end cap of claim 11, wherein said posts are substantially perpendicular to said base.

18. The end cap of claim 11, wherein said ribs are made of plastic.

19. The end cap of claim 11, wherein said ribs are tapered at said distal edges for facilitating insertion of said ribs into the channels of the object.

20. The end cap of claim 11, wherein said base, said posts and said ribs are unitarily formed.

21. A self-adjusting end cap assembly, comprising:
    a base having an inner and an outer surface;
    at least one post connected to said base inner surface;
    at least one rib extending outwardly from said at least one post,
    an object to be capped, said object having an opening; and
    at least one channel in said opening adapted to receive a portion of said at least one post and said at least one rib, said channel having an inner wall;
    wherein said at least one rib extends beyond said inner wall of said channel, such that said at least one rib is sheared by said inner wall of said channel upon insertion of said portion of said at least one post and said at least one rib into said channel for positioning said base within said object.

22. The assembly of claim 21, wherein said base has a hole for allowing wiring to pass through said base.

23. The assembly of claim 21, wherein said base is substantially rectangular.

24. The assembly of claim 21, wherein said at least one post is substantially rectangular.

25. The assembly of claim 24, wherein said at least one post has corners that are rounded.

26. The assembly of claim 21, wherein said at least one post is substantially oblong.

27. The assembly of claim 21, wherein said at least one post is substantially perpendicular to said base.

28. The assembly of claim 21, wherein said at least one rib is made of plastic.

29. The assembly of claim 21, wherein said at least one rib is tapered at a distal edge for facilitating insertion of said at least one rib in said at least one channel of said object to be sealed.

30. The assembly of claim 21, wherein said base, said at least one post and said at least one rib are unitarily formed.

31. The assembly of claim 21, wherein said object and said channel are unitarily formed.

32. The assembly of claim 21, further comprising at least one wall connected to said inner surface of said base for further securing said base to said object.

33. A self-adjusting end cap assembly, comprising:
    a base having an inner and an outer surface;
    two posts connected to said base inner surface;
    a rib extending outwardly from each of said posts, said ribs having distal edges separated by a first distance;
    an object to be capped, said object having an opening; and
    two channels connected to said opening adapted to receive a portion of said posts and said ribs, each of said channels having an inner wall separated by a second distance;
    wherein said first distance is greater than said second distance, such that said ribs are sheared by said inner walls of said channels upon inserting said portion of said posts and said ribs into said channels for positioning said base within said object.

34. The assembly of claim 33, wherein said base has a hole for allowing wiring to pass through said base.

35. The assembly of claim 33, wherein said base is substantially rectangular.

36. The assembly of claim 33, wherein said posts are substantially rectangular.

37. The assembly of claim 36, wherein said posts have corners that are rounded.

38. The assembly of claim 33, wherein said posts are substantially oblong.

39. The assembly of claim 33, wherein said posts are substantially perpendicular to said base.

40. The assembly of claim 33, wherein said ribs are made of plastic.

41. The assembly of claim 33, wherein said ribs are tapered at a distal end for facilitating insertion of said ribs in said channels of said object to be sealed.

42. The assembly of claim 33, wherein said base, said posts and said ribs are unitarily formed.

43. The assembly of claim 33, wherein said object and said channels are unitarily formed.

44. The assembly of claim 33, further comprising at least one wall connected to said inner surface of said base for further securing said base to said object.

\* \* \* \* \*